United States Patent Office 2,788,838
Patented Apr. 16, 1957

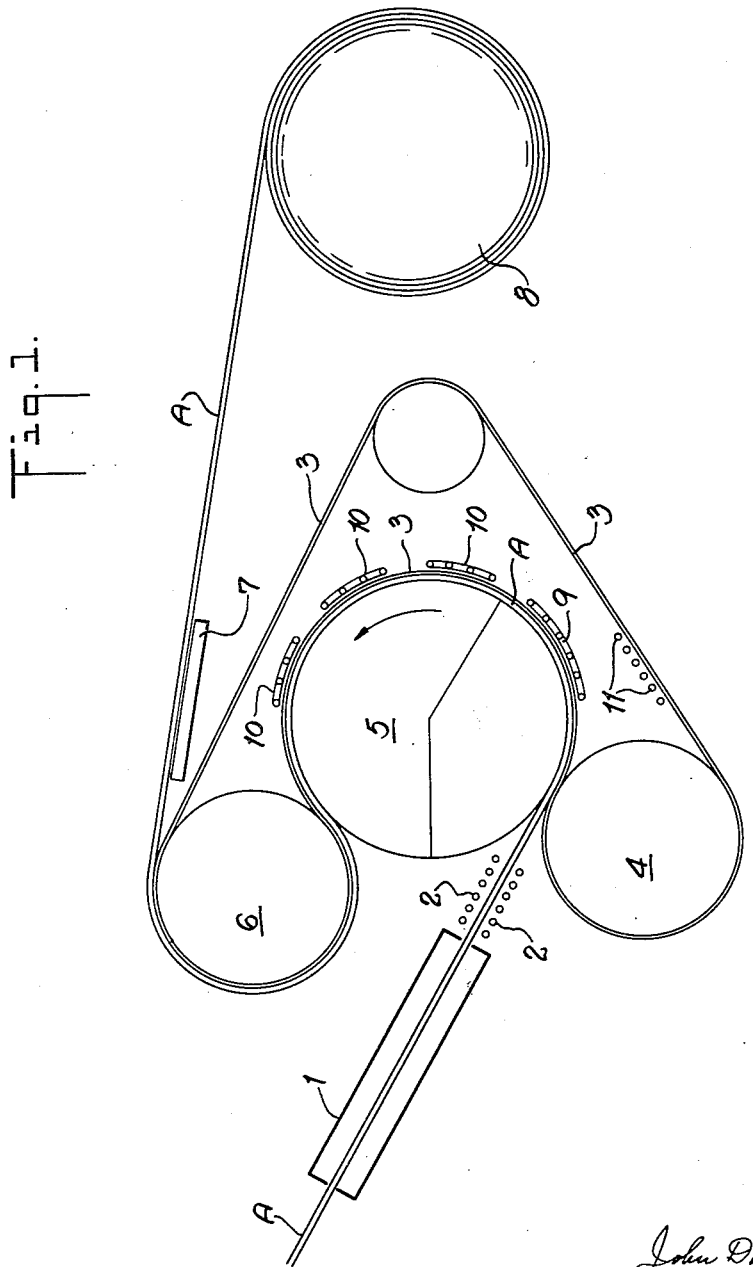

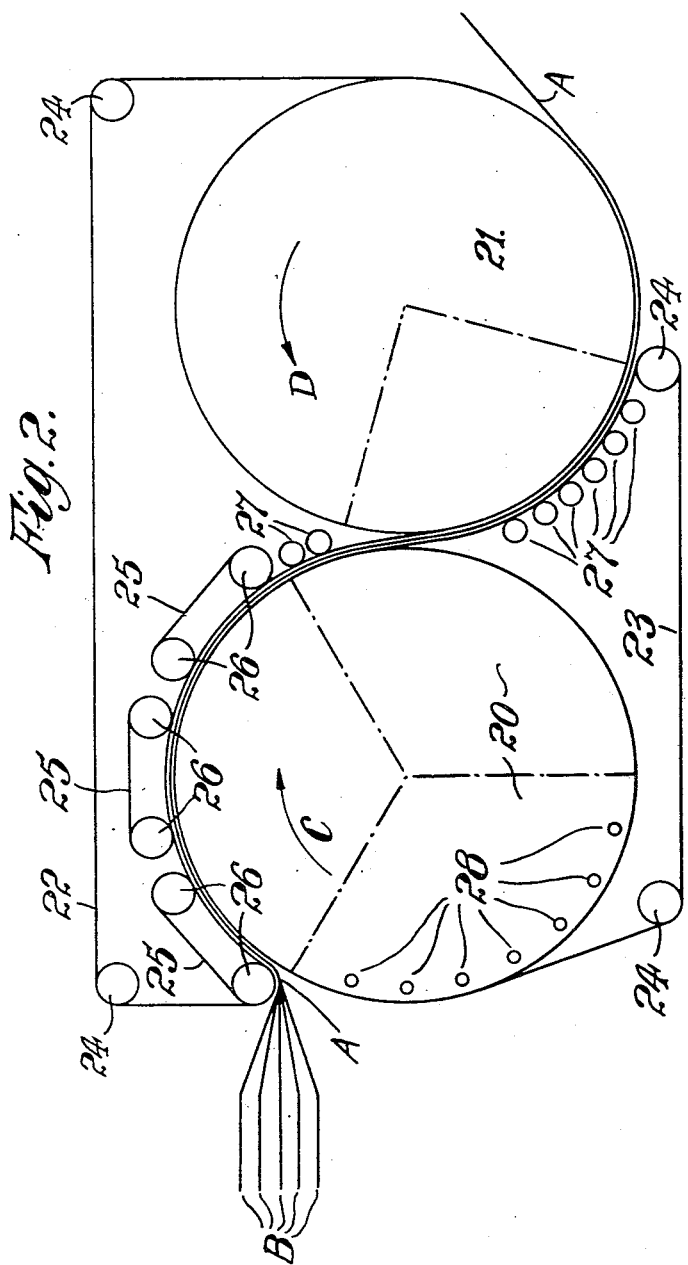

2,788,838
APPARATUS FOR FORMING THERMOPLASTIC CONVEYOR BELTING

John Douglas Crabbe, Liverpool, and Fredrick William Warren, Wilmslow, England, assignors to Dunlop Rubber Company Limited, London, England, a British company Application January 18, 1954, Serial No. 404,653

15 Claims. (Cl. 154—3)

This invention relates to belting and in particular to conveyor belting.

It is known to form such belting from fabric and vulcanised rubber but when the belting is used in places where the risk of fire is great, for example coal mines, the inflammable nature of the rubber proves to be a source of danger.

It has been proposed to form belting from fabric and a non-inflammable thermoplastic material such as polyvinyl chloride. The method usually employed for the manufacture of rubber belting is not however satisfactory with thermoplastic materials, which do not set during the heating process, and it is the object of the present invention to provide an improved process applicable to the manufacture of belting using such materials. A further object of the invention is to provide apparatus for carrying out the process.

According to the present invention a process for the manufacture of belting comprises assembling a plurality of fabric plies coated with a thermoplastic composition in superposed relationship, heating the assembly by one or more radio-frequency heaters and raising it to a temperature such that when the assembly is subjected to pressure the composition will be fused and the assembly consolidated, subjecting the assembly to the required pressure while it is at the said temperature to effect consolidation and maintaining the pressure on the assembly while the assembly is cooled to set the composition.

According to the invention also apparatus for the manufacture of belting comprises a radio-frequency heater adapted to raise the temperature of an assembly of superposed fabric plies coated with a thermoplastic composition to the fusion point of the thermoplastic composition, means for applying pressure to the assembly while at the temperature of fusion and means for cooling the assembly to set the composition while the assembly is under pressure.

The thermoplastic compositions employed must of course be such as are heated by the passage of radio-frequency currents. Polyvinyl chloride compositions have this property and are moreover particularly important since they can be made non-inflammable and the invention is therefore particularly directed to the product of belting incorporating such compositions.

While the invention is applicable to batch processes it is more important in continuous processes and will therefore be more particularly described with reference to such processes and apparatus for carrying them out.

In one form of the invention the assembled plies after heating by a radio-frequency heating unit or units are consolidated and set by engaging the underside of the belting assembly with an endless pre-heated steel carrier band and then passing the assembly and the band through the nip between a central drum and a lower heated drum, round half the circumference of the central drum through the nip between the central drum and a water-cooled upper drum and round the upper drum. The band is externally heated for approximately one quarter of the distance of the circumference of the central drum and is then cooled until it passes between the central drum and the upper drum.

Further cooling of the assembly may be provided by passing it over a water-cooled platen and then round further cooling drums.

In a further form of the invention the assembly is fed between two endless flexible bands and carried by the bands between one or more radio-frequency heating electrodes and the cylindrical surface of a first drum through the nips between the first drum and a series of pressure rollers and then through the nips between the cylindrical surface of a second drum and a further series of pressure rollers.

Each endless band is of a construction such that it transmits radio-frequency energy without substantial absorption thereof and is preferably formed of laminations of glass cloth impregnated with silicone rubber. Since when heating by radio-frequency the centre of the mass tends to become hotter than the outside surfaces due to radiation and conduction losses it may be necessary to supplement such heating by other means such as (a) infra-red radiation
(b) hot air jets applied to the electrodes and/or the outer surfaces of the assembly at the point of entry between the bands.

The invention will now be more particularly described with reference to the accompanying drawings wherein:

Figure 1 shows diagrammatically one form of the invention, and

Figure 2 shows diagrammatically an alternative form of the invention.

A belting assembly is built up of a plurality of fabric plies coated with a non-inflammable thermoplastic polyvinyl chloride composition which can be fused by heating and set by subsequent cooling. The assembly may be provided with U-shaped strips welded along its edges by radio-frequency heating as described in our co-pending application Ser. No. 403,838, filed January 13, 1954, now Patent No. 2,757,709.

As shown in Figure 1, the assembled plies A are passed between a bank of radio-frequency heating units 1 where the thermoplastic composition, particularly in the central layers of the assembly, is heated to fusion temperature to facilitate the bonding of the plies under pressure, as will presently be described. In order to maintain the temperature of the assembly and ensure that the outside surfaces of the assembly are at the required temperature up to the application of pressure, the assembly is then passed through a supplementary heating unit 2 which may be a bank of electrical infra-red heating bars or hot-air jets.

One face of the assembly is engaged by an endless steel band 3 which is carried through the nip between a lower steam-heated drum 4 and a central drum 5 with the assembly, the drums exerting pressure on the assembly and band as they pass through the nip. The steel band exerts pressure on the belting while it passes around about half of the circumference of the central drum 5. The assembly and the band then pass through the nip between the central drum 5 and a water-cooled upper drum 6 where the assembly is partially cooled and set. Final cooling and setting of the composition is obtained by passing the assembly over a water cooled platen 7 and if necessary a further series of cooling drums (not shown) before coiling on a batching-up drum 8.

During the passage of the steel band 3 round the central drum 5 it is heated for one half of the distance covered by steam coils 9. Alternatively infra-red radiation bars may be used for this purpose. The steel band is then cooled by passing cold water through a bank of tubes 10 arranged round the circumference of the drum between the steam coils 9 and the nip between the central and upper drums.

In order to raise the temperature of the band 3, where it initially contacts the assembly A, to the fusion temperature of the composition the band passes through a bank of infra-red radiating bars 11 located adjacent the return path of the band.

In a second embodiment of the invention (Figure 2) two drums 20, 21 rotating in the direction of the arrows C, D, are each partially encircled by two endless flexible bands 22, 23 made of glass-cloth plies impregnated with a silicone rubber composition. The bands are tensioned around idler pulleys 24 and are so disposed that one band 23 is in contact with part of the surface of the first drum 20 with the other band 22 lying adjacent its outer surface (to describe an arc of greater radius) and the other band 22 is in contact with part of the surface of the second drum 21 with the band 23 lying in an arc of greater radius from the centre of the second drum.

Radio-frequency heating electrodes in the form of steel bands 25 rotatable on pulleys 26 are disposed around the greater portion of the arc of the drum 20 encircled by the bands 22, 23, and are in contact with the inner surface of the band 22. The drum 20 is earthed and forms a complementary electrode. The portions of the bands 22, 23 on the arc of contact with the drum 20 intermediate the electrodes 25 and the second drum 21 are in contact with pressure rollers 27 spring-loaded toward the centre of the first drum 20. Similar pressure rollers 27 are in contact with the inner surface of the band 23 in the region of its arc embracing the second drum 21. The drum 21 is water-cooled and the drum 20 is provided with infra-red heaters or hot air jets 28 located in a position to pre-heat the band 23 before it enters the area influenced by the electrodes.

To avoid radiation and conduction losses, the travelling band electrodes 25 may be located in a chamber in which hot air is circulated and further heating by means of hot air jets or infra-red heaters may be given to the outside surfaces of the assembly immediately prior to entry into the nip between the bands 22, 23.

Individual plies B of belting fabric impregnated with a polyvinyl chloride composition are assembled in superposed relationship prior to the meeting point of the two bands 22 and 23 on the surface of the drum 20. The assembly A is carried forward between the bands under light pressure round part of the surface of drum 20 where it is heated by radio-frequency oscillations between the electrode or electrodes 25 and the drum to the fusion temperature of the composition. The pressure rollers 27 compress the ply assembly as the composition is progressively cooled to set from the point at which it leaves the radio-frequency field and is carried round the drum 21. The consolidated ply assembly emerging from the two bands is subsequently reeled up on a batching-up drum.

What we claim is:

1. Apparatus for forming belting which comprises a primary drum, a second, cooled drum, means for drawing a sheet of superposed plies of fabric coated with an organic thermoplastic composition in succession part way about said primary drum and thence reversely part way about said cooled drum, means comprising a high frequency electric element positioned to generate alternating high frequency stresses in said sheet for heating said sheet throughout its thickness and means for compressing said heated sheet on said primary drum.

2. The apparatus of claim 1 in which said high frequency electric element is positioned to heat said sheet in advance of its contact with said primary drum.

3. The apparatus of claim 1 in which said high frequency electric element is positioned to heat said sheet under pressure on said primary drum.

4. The apparatus of claim 3 in which said primary drum forms an electrode of said high frequency electric element.

5. Apparatus for the manufacture of belting which comprises a rotatable central drum, a rotatable heated drum pressed toward said central drum, a rotatable cooled drum pressed toward said drum and spaced from said heated drum, means for drawing a sheet of superposed plies of fabric coated with an organic thermoplastic composition between said central drum and said heated drum, thence about said central drum, between said central drum and said cooled drum and about said cooled drum, an endless band mounted to pass under tension about said heated drum and the sheet on said central drum and about said cooled drum and a high frequency electric element positioned to form high frequency alternating stresses throughout said sheet in a zone of its travel in advance of its contact with said cooled drum.

6. Apparatus according to claim 5 wherein the flexible bands are each formed from laminations of glass cloth impregnated with a silicone rubber composition.

7. The apparatus of claim 5 in which said sheet is heated while in contact with said central drum.

8. The apparatus of claim 5 in which said high frequency electric element is positioned at the path of said sheet in advance of its contact with said central drum.

9. The apparatus of claim 5 having heaters positioned to heat said endless band as it approaches said heated drum.

10. The apparatus of claim 5 having cooling means positioned to cool said band and sheet on said central drum in advance of said cooled drum.

11. Apparatus according to claim 5 wherein the endless band is externally heated prior to its passage round the heated drum and for approximately one quarter of the distance of the circumference of the central drum and is then cooled until it passes through the nip between the central drum and the water-cooled drum.

12. Apparatus according to claim 5 wherein a water-cooled platen is located adjacent the water-cooled drum to further cool the assembly as it leaves the water-cooled drum.

13. Apparatus for the manufacture of belting which comprises a primary rotatable drum, a high frequency electric element about an arc of the circumference of said drum, said element comprising at least one pair of pulleys and an endless belt about said pulleys and bearing against said drum, said belt forming an electrode of said high frequency electric element, the other electrode being said drum, a rotatable cooled drum parallel to said primary drum, an endless belt under tension passing between the belt of said high frequency electric element and said primary drum and thence with reverse curvature about said cooled drum and means for drawing a sheet of superposed plies of belting fabric coated with an organic thermoplastic composition between said high frequency electric element and said endless belt on said primary drum and thence between said water cooled drum and said endless belt.

14. The apparatus of claim 13 in which said belt passing about said pulleys is of glass fabric impregnated with a silicone resin.

15. Apparatus according to claim 14 wherein the electrodes are endless steel bands each rotatable on a pair of pulleys and in contact with the face of one of the flexible bands remote from the first drum periphery.

References Cited in the file of this patent

UNITED STATES PATENTS

| 2,296,372 | Smith et al. | Sept. 22, 1942 |
| 2,351,350 | Mallory | June 13, 1944 |
| 2,434,541 | Bierer | Jan. 13, 1948 |
| 2,439,918 | Auxier et al. | Apr. 20, 1948 |
| 2,442,443 | Swallow | June 1, 1948 |
| 2,469,972 | Lowry et al. | May 10, 1949 |
| 2,545,370 | Mittelmann | Mar. 13, 1951 |
| 2,571,599 | Milne | Oct. 16, 1951 |